United States Patent Office 2,736,215
Patented Feb. 28, 1956

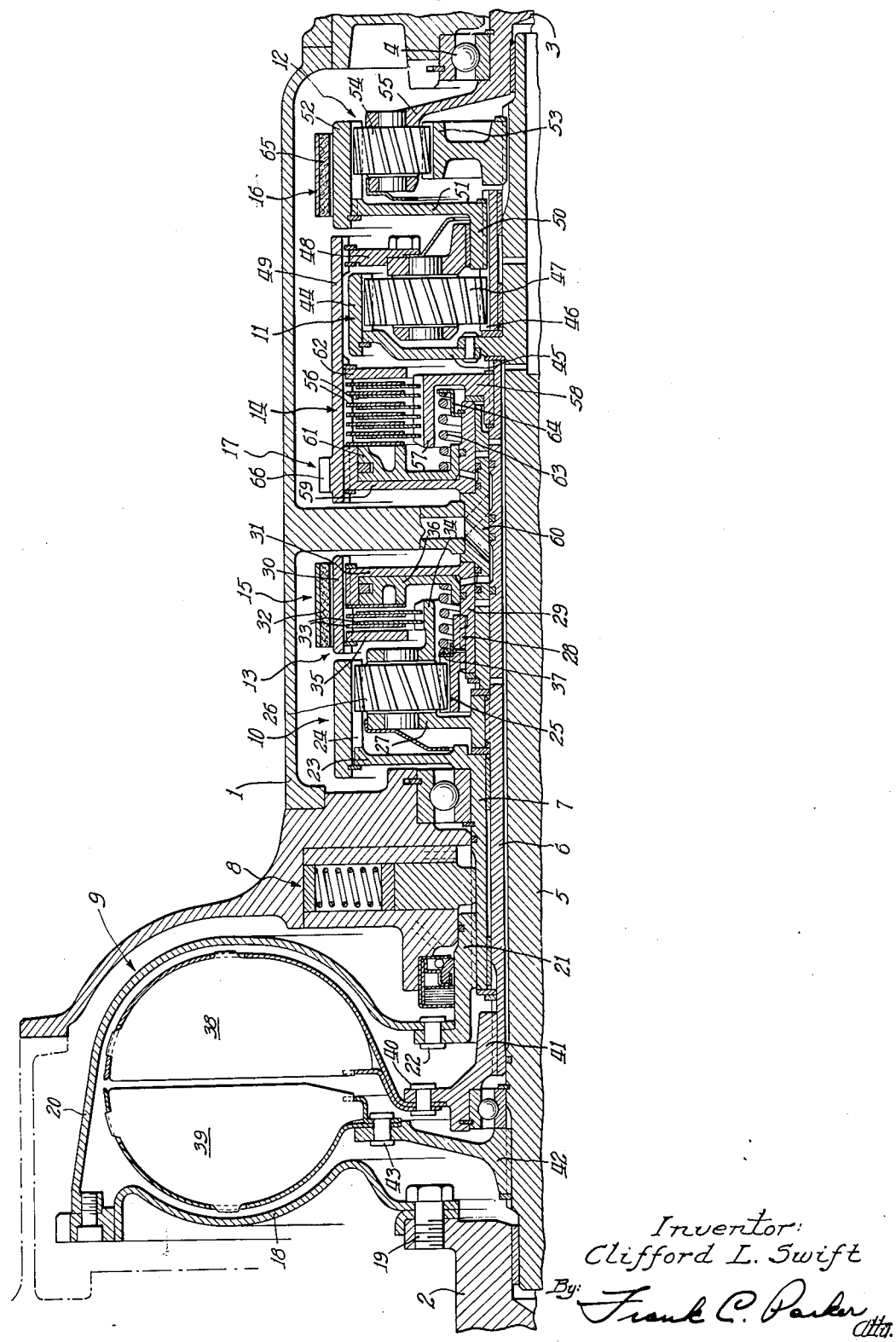

2,736,215

TRANSMISSION

Clifford L. Swift, Muncie, Ind., assignor to The Borg-Warner Corporation, Chicago, Ill., a corporation of Illinois Application May 8, 1951, Serial No. 225,158

3 Claims. (Cl. 74—759)

The present invention relates generally to transmissions and more particularly relates to transmissions for automotive vehicles.

The principal object of the present invention is to provide a transmission suitable for use in automotive vehicles which may be conveniently controlled by means of an automatically operable hydraulic control system and which, while affording the advantages of smooth and easy operation enjoyed when a hydrodynamic coupling device is employed in the different power transmission paths, employs reduction planetary gearing for providing a sufficiently large number of driving ratios as will facilitate optimum performance under substantially all driving conditions.

A more specific object of the invention is to provide a transmission utilizing planetary gearing in conjunction with a hydrodynamic coupling device which will provide four different forward speed drives, including a substantially direct drive through the transmission, and a reverse drive between the drive and driven shafts.

Still more specifically it is another object of the invention to provide a transmission wherein a first planetary gear set, which is directly driven by the vehicle engine and which may be conditioned either for reduced or direct drive operation, transmits the drive to a hydrodynamic coupling device, from which the drive is transmitted to a second set of planetary gearing which may be conditioned for further reducing the drive, transmitting it directly or reversing the drive before transmitting it to the transmission driven shaft which drives the vehicle driving wheels.

Another object of the invention is to provide a transmission wherein an intermediate shaft, which actually functions as a drive shaft for a portion of the transmission mechanism, at all times transmits the drive to a hydrodynamic coupling device which, in turn, drives a pair of input elements of a set of planetary gearing, the intermediate shaft also being selectively connectible with another input element of the planetary gearing to provide a split power path to the planetary gearing, which is utilized in establishing the higher speed drives through the transmission.

In connection with the immediately preceding object of the invention, the planetary gearing has a pair of input elements comprising interconnected sun and ring gears, which at all times receive the drive from the hydrodynamic coupling device, and a planetary gear carrier which may also be clutched to the intermediate drive shaft for also receiving the drive, whereby the planetary gearing is substantially locked up so as to transmit a substantially direct drive therethrough. Besides the clutch for connecting the planetary gearing to the intermediate drive shaft, the planetary gearing also has a friction brake which is engaged during each of the low forward speed drives through the transmission. Thus, by merely disengaging the clutch and engaging the brake or vice versa, the transmission may be respectively conditioned for either low forward speed operation or high forward speed operation, under each of which conditions, two different driving ratios are available.

The above and numerous other objects and advantages of the present invention will become apparent from the following detailed description, when read in conjunction with the appended drawing which comprises an elevational sectional view showing the principal features of the invention.

With reference now to the drawing, the transmission is housed within a casing 1 and includes a drive shaft 2 and a driven shaft 3, both of which are rotatably mounted within the casing 1 by means of ball bearing elements, the ball bearing element 4 for rotatably mounting the driven shaft 3 in the casing being the only bearing element shown. The transmission also includes three intermediate shafts 5, 6 and 7, all of which are concentrically mounted with respect to each other. The intermediate shaft 5 is rotatably mounted and piloted within both the drive shaft 2 and the driven shaft 3. The transmission also includes a fluid pressure supply pump 8, a hydrodynamic coupling device 9, three planetary gear sets indicated respectively by reference numeral 10, 11 and 12, a front clutch 13, a rear clutch 14, a front friction brake 15, a rear friction brake 16 and a positive brake 17.

The drive shaft 2 is secured to a disc-like casing member 18 by means of bolts 19 and the casing member 18 is in turn bolted to a second casing member 20. The two casing members 18 and 20 together comprise a housing for the hydrodynamic coupling device 9. The casing member 20 is secured to a short collar 21 by means of a plurality of rivets 22, the collar 21 being splined to the intermediate shaft 7. The intermediate shaft 7 is formed with a radially extending flange 23 which is splined to a ring gear 24 of the planetary gear set 10. The planetary gear set 10 also includes a sun gear 25, a plurality of planetary pinions 26 which mesh respectively with the ring gear 24 and the sun gear 25, and a planetary pinion carrier 27 for rotatably mounting the pinions 26, the carrier 27 being splined to the intermediate shaft 6. The sun gear 25 comprises an offset flange formed integrally with a collar 28 which is splined to a short sleeve shaft 29.

As will be noted, a direct drive from the drive shaft 2 to the ring gear 24 is at all times completed and extends through the two casing members 18 and 20 and through the collar 21 and sleeve shaft 7.

The friction brake 15 is provided for holding the sun gear 25 stationary in order to complete a reduced drive to the intermediate shaft 6 through the planetary gear set 10 when the ring gear 24 is being driven. The friction brake 15 comprises a rotatable drum element 30 which is splined to a radially extending flange 31 formed integrally on the short sleeve shaft 29, and also includes a contractible friction band 32 for engaging the drum element 30 to hold it stationary.

The friction clutch 13 is provided for interconnecting the planetary pinion carrier 27 and the sun gear 25. The friction clutch 13 includes a plurality of interleaved friction discs 33, alternate ones of which are splined respectively to the drum element 30 and to an axially extending flange 34 integrally formed on the carrier 27. Splined and keyed to the drum element 30 is a pressure disc 35 and an annular clutch actuating piston 36, reciprocably mounted within an annular cylinder formed by the sleeve shaft 29 and the flange 31, is provided for compressing the discs 33 against the pressure disc 35 in order to effect an engagement of the clutch 13. When fluid under pressure is admitted into the cylinder behind the piston 36 the piston is moved to the left in opposition to the bias of a compression spring 37 in order to effect engagement of the clutch 13, which locks up the planetary gear set 10. As is apparent, engagement of the friction clutch 13 causes the planetary gear set 10 to rotate as a unit and to transmit a direct drive to the intermediate shaft 6.

The hydrodynamic coupling device 9 comprises a driving element 38 and a driven element 39 both of which are rotatably mounted within the casing members 18 and 20. The casing members 18 and 20 are filled with a fluid and upon rotation of the driving element 38 a drive is transmitted to the driven element 39. The driving element 38 is driven directly by the intermediate shaft 6, the element 38 being secured by means of rivets 40 to a collar 41 that is splined to the intermediate shaft 6. The driven element 39 is secured to a collar 42 by means of rivets 43 and the collar 42 is splined to the intermediate shaft 5 so that when the driven element 39 is driven by the driving element 38 a drive is completed to the intermediate shaft 5.

The planetary gear set 11 comprises a ring gear 44 which is splined to a disc-like member 45 carried by the intermediate shaft 5. The planetary gear set 11 also includes a sun gear 46, a plurality of planetary pinions 47 which mesh respectively with the sun gear 46 and the ring gear 44, and a planetary pinion carrier 48 for rotatably mounting the pinions 47. The carrier 48 is splined and keyed to a cylindrical member 49 and the sun gear 46 has an extension which is splined and keyed to a collar 50 having a radially extending flange 51. The planetary gear set 12 comprises a ring gear 52 splined and keyed to the flange 51, a sun gear 53 splined and keyed to the intermediate shaft 5, a plurality of planetary pinions 54 which mesh respectively with the sun gear 53 and the ring gear 52, and which are rotatably mounted upon a radially and slightly axially extending flange portion 55 of the driven shaft 3.

It should here be noted that the ring gear 44 of the planetary gear set 11 and the sun gear 53 of the planetary gear set 12, both being connected to the intermediate shaft 5, are therefore both driven whenever a drive is transmitted to the intermediate shaft 5. It should also be noted that the sun gear 46 of the planetary gear set 11 and the ring gear 52 of the planetary gear set 12 are also both connected together.

The friction clutch 14 is provided for transmitting a drive directly from the intermediate shaft 6 to the planetary pinion carrier 48. The friction clutch 14 comprises a plurality of interleaved friction discs 56, alternate ones of which are splined respectively to the drum-like member 49 and to an axially extending portion 57 of a collar 58 splined to the intermediate shaft 6. The friction clutch 14 also includes an annular cylindrical element 59 splined to the drum 49 and rotatably mounted with respect to a stationary sleeve shaft 60, and an annular piston 61 reciprocably mounted within the cylindrical element 59 is provided for compressing the friction discs 56 against a pressure disc 62 in order to cause engagement of the clutch 14. The friction disc 62, as shown, is splined to the drum 49. A compression spring 63, mounted between an abutment ring 64, carried by the cylinder 59, and the piston 61, normally biases the piston 61 to the left to effect disengagement of the clutch 14. Before the clutch 14 can be engaged, the fluid pressure admitted into the cylinder 59 behind the piston 61 must be great enough to overcome the compression spring 63.

The friction brake 16 comprises a contractible brake band 65, which upon contraction, engages the outer periphery of the ring gear 52 in order to hold both the ring gear 52 and the sun gear 46 stationary. The friction brake 16, when engaged, therefore completes a reduced drive between the intermediate shaft 6 and the output shaft 3. The drum element 49 is provided with a plurality of external teeth 66 which form the rotatable element of the positive brake 17. The positive brake 17 also includes a sprag or pawl (not shown) which is selectively engageable with the teeth 66 in order to hold the drum element 49 and planet pinion carrier 48 stationary. Upon engagement of the positive brake 17 a reduced reverse drive is completed between the intermediate shaft 5 and the driven shaft 3.

As will be noted, when either the positive brake 17 or the friction brake 16 are engaged a single torque path is completed to the planetary gearing 11 and 12 and this torque path proceeds from the intermediate shaft 6, through the hydrodynamic coupling device 9 and through the intermediate shaft 5 to the ring gear 44 and sun gear 53. When the positive brake 17 and the friction brake 16 are disengaged and the friction clutch 14 is engaged, two torque paths transmit rotative power to the planetary gearing 11 and 12. The first path is the same as that just mentioned and the second path extends from the intermediate shaft 6 through the clutch 14 to the planet gear carrier 48. As will subsequently be brought out more clearly, the two torque paths to the planetary gearing 11 and 12 are utilized during the completion of the higher forward speed drives through the present transmission mechanism.

In the operation of the present transmission it is contemplated that fluid pressure supplied by the pump 8, which is driven directly by the intermediate sleeve shaft 7, will supply the fluid pressure for causing engagement of the friction clutches 13 and 14 and the friction brakes 15 and 16, as well as supply sufficient fluid pressure for maintaining a supply of fluid in the hydrodynamic coupling device 9 and lubricating all of the rotatable elements of the transmission. The present transmission provides four forward speed drives and a single reverse drive between the drive shaft 2 and the driven shaft 3 and the following table shows which clutches and brakes are engaged and which are disengaged during the completion of each of the drives through the transmission.

|  | Clutches | | Brakes | | |
| --- | --- | --- | --- | --- | --- |
|  | 13 | 14 | 15 | 16 | 17 |
| First | Off | Off | On | On | Off. |
| Second | On | Off | Off | On | Off. |
| Third | Off | On | On | Off | Off. |
| Fourth | On | On | Off | Off | Off. |
| Reverse | Off | Off | On | Off | On. |

The first or the lowest forward speed drive between the drive shaft 2 and the driven shaft 3 is completed when the friction brakes 15 and 16 are engaged while the positive brake 17 and the friction clutches 13 and 14 are disengaged. This drive proceeds from the drive shaft 2 through the casing members 18 and 20 and through the intermediate shaft 7 to the ring gear 24. Since the friction brake 15 is engaged, the sun gear 25 is held stationary and the forward rotation of the ring gear 24 causes the planetary pinion carrier 27 and the intermediate shaft 6 to also be rotated forwardly but at a reduced drive with respect to the shaft 7. The drive then proceeds from the intermediate shaft 6, through the drive and driven elements 38 and 39 of the hydrodynamic device 9, and through the intermediate shaft 5 to the ring gear 44 and sun gear 53 of the planetary gearing 11 and 12. Since the friction brake 16 is engaged, rotation of the ring gear 44 forwardly merely causes the planet pinion carrier 48 to be idled in a forward direction. But, since the ring gear 52 is also held stationary, the sun gear 53 causes the pinions 54 to walk around inside of the ring gear 52 in a forward direction, thereby driving the carrier 55 and driven shaft 3 in a forward direction. During the first forward speed drive reduction takes place in both planetary gear sets 10 and 12.

Second forward speed drive through the present transmission is completed when the clutch 13 and the brake 16 are engaged while the clutch 14 and brakes 15 and 17 are disengaged. Engagement of the clutch 13 causes the planetary gear set 10 to be locked up so that the intermediate shaft 6 is driven at the same speed as the drive shaft 2. The drive then proceeds from the intermediate shaft 6 over the same path as was traced during the first forward speed drive and, as is apparent, reduction takes place only in the planetary gear set 12 during the second forward speed drive.

Third forward speed drive through the present transmission may be completed by engaging the clutch 14 and brake 15 while the clutch 13 and brakes 16 and 17 are disengaged. The engagement of the brake 15 causes the same reduced drive to be transmitted to the intermediate shaft 6 as was traced during first forward speed drive. The drive from the intermediate shaft 6 proceeds to the ring gear 44 and sun gear 53 and is also the same as was traced during first forward speed drive. Engagement of the clutch 14, however, directly connects the planetary pinion carrier 48 of the planetary gear set 11 with the intermediate shaft 6. Therefore, except for the slight amount of slipping which occurs between the drive and driven elements 38 and 39 of the hydrodynamic coupling device 9, the planetary pinion carrier 48 rotates at the same speed as the ring gear 44 and the sun gear 53. With the ring gear 44 and the carrier 48 rotating at substantially the same speed, the planetary gear set 11 is substantially locked up so that the sun gear 46 rotates at substantially the same speed as the ring gear 44. Inasmuch as the sun gear 46 and the ring gear 52 are directly connected together, the ring gear 52 and the sun gear 53 also are rotating at substantially the same speed, so that the planetary gear set 12 is also locked up to cause the driven shaft 3, which is connected to the carrier 55, to be rotated at substantially the same speed as the intermediate shafts 5 and 6. As is apparent, reduction takes place only in the planetary gear set 10 during third forward speed drive through the transmission.

Fourth forward speed drive, which is substantially a direct drive, may be established through the present transmission by engaging both clutches 13 and 14 while all three brakes 15, 16 and 17 are disengaged. Engagement of the clutch 13 causes the planetary gear set 10 to be locked up so that the intermediate shaft 6 is driven at the same speed as the drive shaft 2 and engagement of the clutch 14 causes the planetary gearing 11 and 12 to be substantially locked up so that the driven shaft 3 rotates at substantially the same speed as the intermediate shafts 5 and 6. During fourth forward speed drive through the transmission there is no reduction in any of the gear sets. It is only during the third and fourth forward speed drives that the torque is split into two paths for transmission to different elements of the planetary gearing 11 and 12.

Reverse drive may be established through the present transmission by engaging the positive brake 17 and the friction brake 15 while the friction brake 16 and friction clutches 13 and 14 are disengaged. The engagement of the friction brake 15 causes a reduced drive to be transmitted to the intermediate shaft 6 which proceeds to the ring gear 44 and sun gear 53 in the same manner as described during the description of the operation of the first forward speed drive through the transmission. The ring gear 44 is thus rotated forwardly and, the carrier 48 being held stationary by the brake 17, causes a reverse drive to be imparted to the sun gear 46 and ring gear 52. The ring gear 52 is thus rotated reversely while the sun gear 53 is rotated forwardly. Axial rotation is therefore imparted to the planetary pinions 54, but due to the fact that the ring gear 52 has a greater number of teeth than the sun gear 53, and also because the ring gear 52 is rotating reversely at a higher rate of speed than the sun gear 53, a reverse rotation is imparted to the carrier 55 and the driven shaft 3.

The present invention therefore provides a planetary gearing type transmission which is particularly suitable for use in automotive vehicles wherein the transmission mechanism is designed to be controlled automatically. Further, by according four different forward speed drives the present transmission makes it possible for the automotive vehicle to function easily and economically under all of the different operating conditions to which it will be subjected.

It is contemplated that numerous changes and modifications may be made in the present invention without departing from the spirit or scope thereof.

I claim:

1. In a transmission, the combination of a drive shaft, a driven shaft, means for providing a plurality of power trains through the transmission and including a pair of planetary gear sets connected between said shafts, each of said gear sets including a sun gear, a ring gear and a planet gear carrier, the sun gear of one of the sets being connected to rotate with the ring gear of the other, the ring gear of said one set being connected to rotate with the sun gear of said other set, the planet gear carrier of said other set being connected directly with said driven shaft, a brake for the carrier of said one gear set for completing one of the power trains through the transmission, and a brake for the sun gear of said one gear set and the ring gear of said other gear set for completing another of the power trains through the transmission.

2. In a transmission, the combination of a drive shaft, a driven shaft, means for providing a plurality of power trains through the transmission and including a pair of planetary gear sets connected between said shafts, each of said gear sets including a sun gear, a ring gear and a planet gear carrier, the sun gear of one of the sets being connected to rotate with the ring gear of the other, the ring gear of said one set being connected to rotate with the sun gear of said other set, the planet gear carrier of said other set being directly connected with said drive shaft, a brake for the carrier of said one gear set for completing a reverse power train through the transmission, and a brake for the sun gear of said one set and the ring gear of said other set for completing a forward power train through the transmission.

3. In a transmission, the combination of a drive shaft, a driven shaft, means for providing forward and reverse power trains through the transmission and including a pair of planetary gear sets connected between said shafts, each of said gear sets including a sun gear, a ring gear and a planet gear carrier, the sun gear of one of the sets being connected to rotate with the ring gear of the other, the ring gear of said one set being connected to rotate with the sun gear of said other set, the planet gear carrier of said other set being directly connected with said driven shaft, a positive brake for the carrier of said one gear set for completing the reverse power train through the transmission, and a friction brake for the sun gear of said one set and the ring gear of said other set for completing the forward power train through the transmission.

References Cited in the file of this patent

UNITED STATES PATENTS

| | | |
|---|---|---|
| 2,162,785 | Neracher et al. | June 20, 1939 |
| 2,211,233 | Kelley | Aug. 13, 1940 |
| 2,324,713 | McFarland | July 20, 1943 |
| 2,377,696 | Kelley | June 5, 1945 |
| 2,418,378 | Voytech | Apr. 1, 1947 |
| 2,430,258 | Thompson | Nov. 4, 1947 |
| 2,519,022 | Burtnett | Aug. 15, 1950 |
| 2,551,746 | Iavelli | May 8, 1951 |
| 2,562,464 | Jandasek | July 31, 1951 |
| 2,572,007 | Burtnett | Oct. 23, 1951 |
| 2,606,459 | Carnegie | Aug. 12, 1952 |
| 2,645,135 | Frank | July 14, 1953 |